(12) United States Patent
Saleh et al.

(10) Patent No.: US 6,512,614 B1
(45) Date of Patent: Jan. 28, 2003

(54) WDM-BASED ARCHITECTURE FOR FLEXIBLE SWITCH PLACEMENT IN AN ACCESS NETWORK

(75) Inventors: Adel Abdel Moneim Saleh, Holmdel, NJ (US); Jane Marie Simmons, Middletown, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/416,532

(22) Filed: Oct. 12, 1999

(51) Int. Cl.[7] ................................................. H04J 14/02

(52) U.S. Cl. .......................... 359/124; 370/389; 370/487

(58) Field of Search ................................. 359/124, 128; 370/389, 487

(56) References Cited

U.S. PATENT DOCUMENTS 5,917,830 A * 6/1999 Chen et al. ................. 370/487
5,949,779 A * 9/1999 Mostafa et al. ............. 370/389

* cited by examiner

Primary Examiner—Knife-Michael Negash

(57) ABSTRACT

An access node includes a switch that operates according to a first communication protocol. The access node is coupled by a plurality of feeder network channels to a second access node having a second switch operating according to a second communication protocol. A first distribution network port is coupled to the first switch and to a first distribution network channel bearing signals according to the first communication protocol. A second distribution network port is coupled to a second distribution network channel bearing signals according to the second communication protocol and to the second switch by one of the feeder network channels.

12 Claims, 8 Drawing Sheets

WDM-BASED ARCHITECTURE FOR FLEXIBLE SWITCH PLACEMENT IN AN ACCESS NETWORK

BACKGROUND OF THE INVENTION

1. Field of the Invention

The present invention relates generally to wavelength division multiplexing networks, and more particularly to architectures for flexible switch placement in such networks.

2. Related Art

In currently known access ring architectures, electronic traffic is aggregated or processed in an appropriate electronic switch or router as soon as the customer traffic is delivered to the Access Node by the distribution fiber. Thus, we see that this conventional architecture requires appropriate switches and routers in each Access Node. There are several problems with such an architecture. First, it can be very costly to deploy the necessary switches in each Access Node. Second, it is very difficult to maintain so many switches; also, a lot of work is required if the equipment needs to be upgraded. Additionally, there may be physical space and power limitations in the Access Node, so that all required switches cannot be accommodated.

SUMMARY OF THE INVENTION

In one embodiment of the invention, an access node includes a switch that operates according to a first communication protocol. The access node is coupled by a plurality of feeder network channels to a second access node having a second switch operating according to a second communication protocol. A first distribution network port is coupled to the first switch and to a first distribution network channel bearing signals according to the first communication protocol. A second distribution network port is coupled to a second distribution network channel bearing signals according to the second communication protocol and to the second switch by one of the feeder network channels.

In another embodiment of the invention, a method for use within an access node includes the steps of receiving communication signals including signals according to a first communications protocol and signals according to a second communications protocol, routing the communications signals according to the first protocol to a switch within the access node, where the first switch operates according to the first communications protocol; and routing the communications signals according to the second protocol to a second access node.

Further features and advantages of the present invention as well as the structure and operation of various embodiments of the present invention are described in detail below with reference to the accompanying drawings.

BRIEF DESCRIPTION OF THE FIGURES

The present invention will be described with reference to the accompanying drawing, in which.

DETAILED DESCRIPTION

The present invention is described in terms of the above example. This is for convenience only and is not intended to limit the application of the present invention. In fact, after reading the following description, it will be apparent to one skilled in the relevant art how to implement the present invention in alternative embodiments.

The present invention provides several novel WDM (Wavelength Division Multiplexing)-based architectures for a regional/metropolitan access network. We first provide background information on general access networks and WDM, and then describe the preferred embodiments of the invention.

Background

Figure 1:
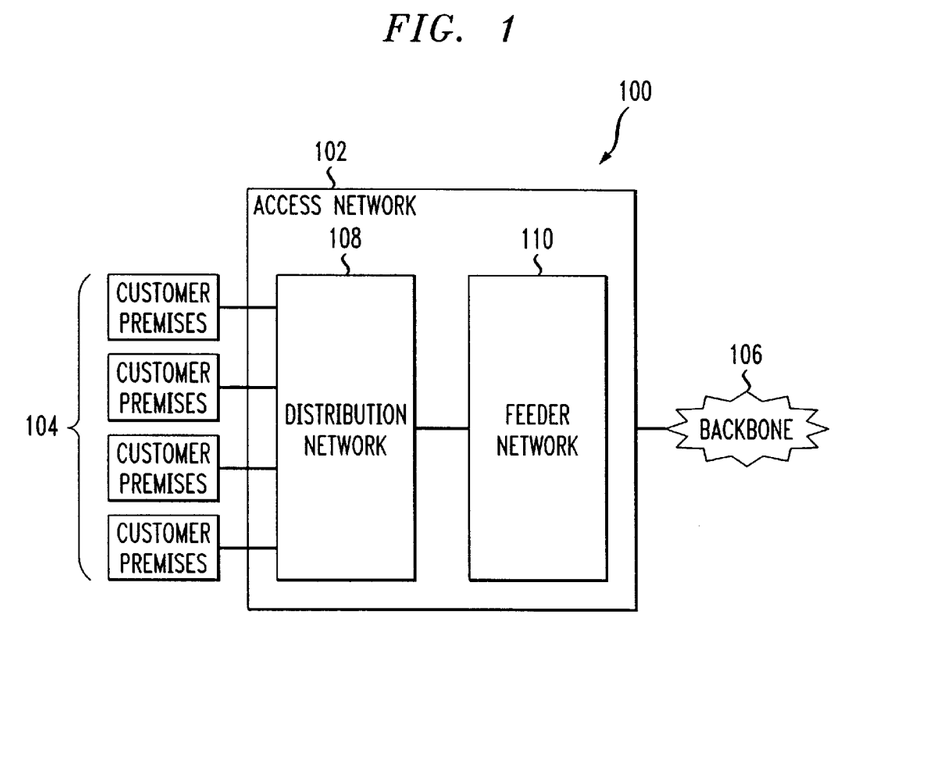
FIG. 1 depicts a network in which an access network provides connectivity between a plurality of customer premises and a backbone.

Access networks are typically used to provide customers with access to backbone networks. FIG. 1 depicts a network 100 in which an access network 102 provides connectivity between a plurality of customer premises 104 and a backbone 106. Examples of backbone networks are an Internet backbone or a long distance phone network.

Access network 102 can be functionally partitioned into a distribution network 108 and a feeder network 110. The distribution network directly interfaces with the customer premises and is responsible for delivering traffic to, and collecting traffic from, the customers. The feeder portion of the network aggregates traffic from the distribution network, delivers traffic to a backbone network, and transfers traffic from one portion of the distribution network to another.

Figure 2:
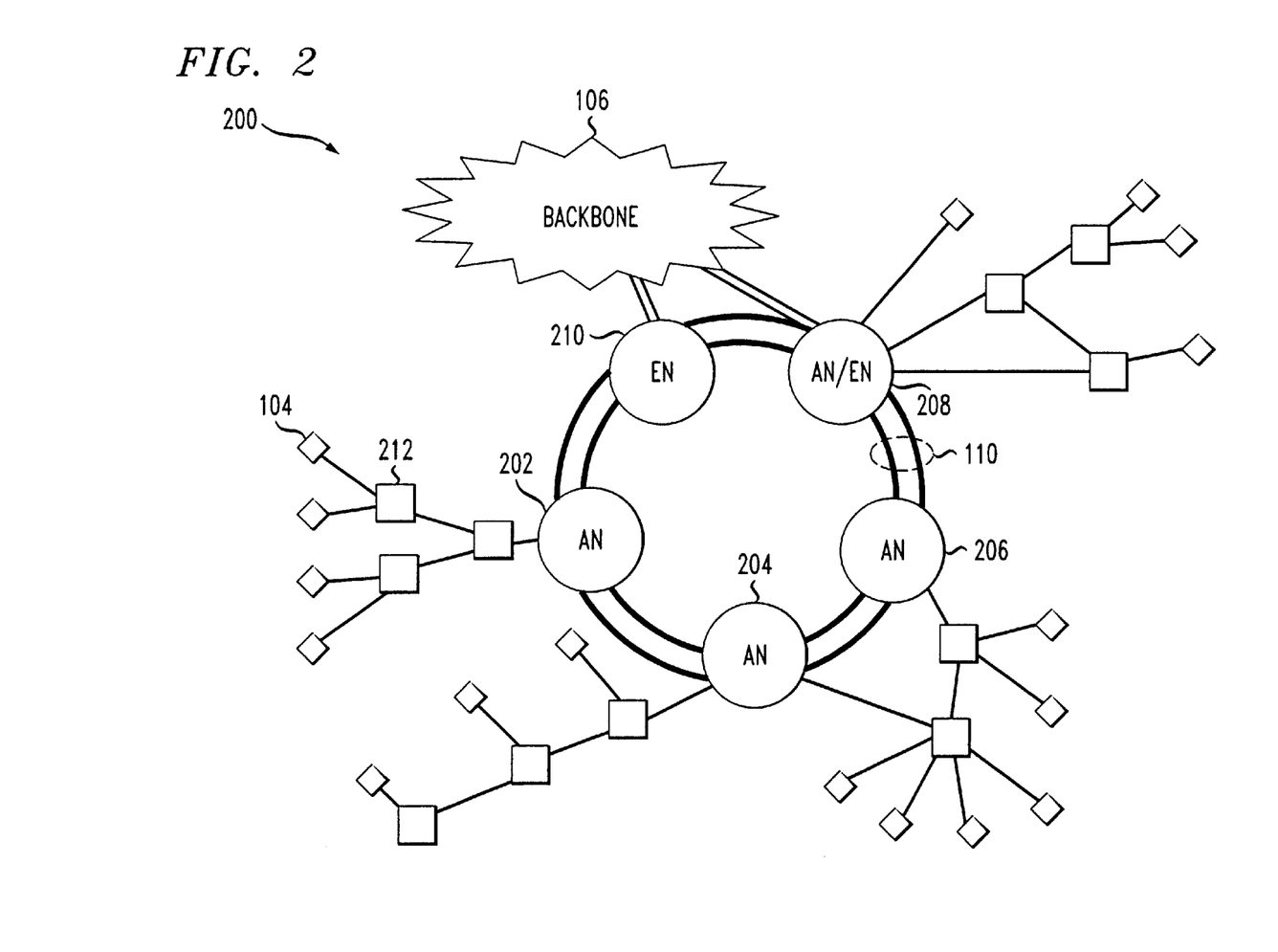
FIG. 2 depicts one possible architecture for a regional/metropolitan access network.

One possible architecture 200 for a regional/metropolitan access network architecture is shown in FIG. 2. Other architectures are possible. Such a network usually covers on the order of 10 to 1000 square miles, and provides access for on the order of 200 to 2000 high-end customers (for example, businesses, government facilities, service providers, and campuses).

In architecture 200, the feeder network 110 has a ring topology, for redundancy purposes, on which are located a set of Access Nodes (ANs) 202, 204, 206, 208 and Egress Nodes (ENs) 208, 210. A node can serve as both an Access Node and an Egress Node, as with AN/EN 208. Access Nodes serve as the intermediary point between the distribution and feeder portions of the network. Most of the aggregation and switching in the access network occurs in the Access Node. Egress Nodes serve as the interface between the feeder network and a backbone network. For example, SONET (Synchronous Optical Network) access rings have a similar topology. However, in currently deployed architectures, traffic aggregation and switching must occur as soon as the traffic is delivered to the feeder network; that is, each Access Node must be equipped with all necessary switches to process any traffic that it delivered there by the distribution network. According to one aspect, the present invention uses WDM technology to allow switches to be deployed in just a subset of the Access Nodes.

In general, the distribution network employs one or more passive splitters or add/drop elements 212 to achieve one of several topologies depending on the required redundancy.

For example, the distribution network connected to AN 202 has a tree topology, the distribution network connected to AN 204 has a bus topology, the distribution network connected to AN/EN 208 has a single-homed ring topology, and the distribution network connected between ANs 204, 206 has a double-homed ring topology. Note that the distribution network is typically comprised of geographically diverse networks that extend a few miles from the Access Nodes, and pass by several customer premises.

Wavelength Division Multiplexing (WDM)

The present invention pertains to wavelength division multiplexing (WDM) access networks. WDM refers to multiple wavelengths being multiplexed onto a single fiber, where each wavelength can support a separate traffic channel. There are a variety of options for deploying a WDM system, with key parameters including the number of wavelengths that are multiplexed onto each fiber and the spacing of the wavelengths.

Figure 3:
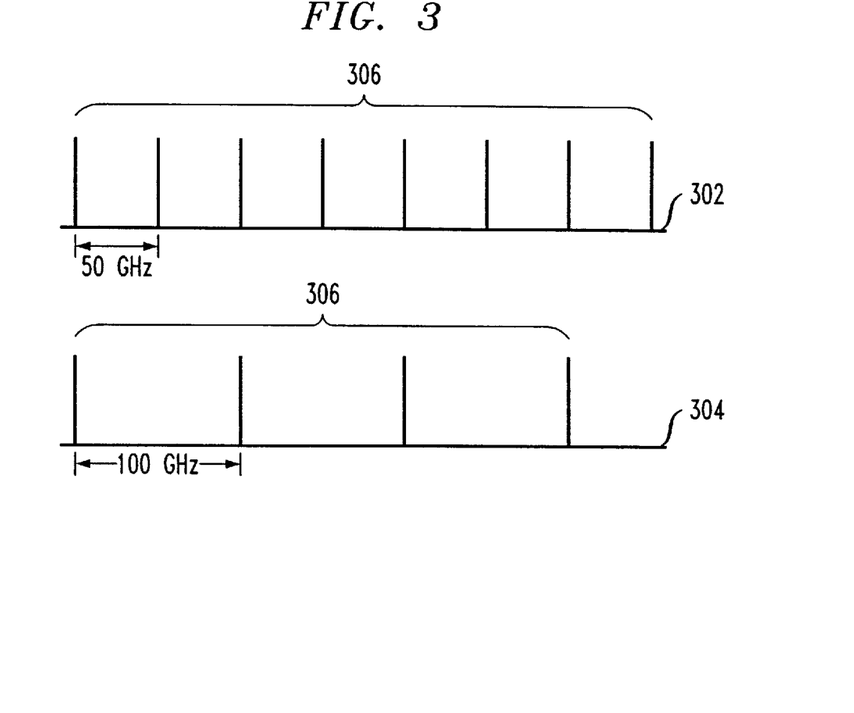
FIG. 3 presents two spectral combs in a WDM network.

FIG. 3 presents two spectral combs 302 and 304. Spectral comb 302 includes 8 wavelengths 306, spaced at 50 GHz. Thus, a fiber carrying this wavelength spectrum can support 8 different traffic channels. Spectral comb 304 in FIG. 3 contains only 4 wavelengths 306, spaced at 100 GHz. Thus, only 4 different traffic channels can be supported.

More wavelengths allow more traffic channels to be carried. However, the more closely spaced the wavelengths are, the more likely they are to interfere with one another; that is, the wavelengths may drift from the desired frequency.

Active Feeder vs. Passive Distribution

One important difference between the feeder network and distribution network is the number of customers served, which in turn affects the cost requirements. The feeder network (for example, ring 110 shown in FIG. 2) is shared by all customers of the access network; thus, the costs of the feeder network are shared by hundreds, or thousands, of customers. This allows the deployment of expensive devices (for example, large switches, configurable multiplexers, very high quality transmitters and receivers, and the like) in the feeder network. In addition, the feeder network is not as geographically dispersed as the distribution network, so that maintenance is easier. This allows the deployment of active components in the feeder network. Active components require electrical power, and thus are less reliable than passive components; however, active components generally provide enhanced performance (for example, more precise filters that are stabilized over a wider temperature range).

In contrast, the distribution network is much more geographically dispersed, with portions extending from the various access nodes. Any given branch of the distribution network supports only tens of users. Since costs are shared over such a small number of customers, it is important that components in the distribution network be relatively low-cost. Also, due to the geographic dispersion of the distribution network, it is necessary that component failures be very rare events, so that required maintenance is minimized. Thus, it is desirable that the distribution network be entirely passive, that is, that all components deployed in the distribution network be passive.

We envision WDM being deployed in both the feeder and distribution networks with possibly a different number of wavelengths deployed on the feeder fiber and the distribution fiber. The passive components of the distribution network present several challenges in delivering wavelengths to customers. The present invention uses several novel architectural principles that allow for effective, efficient, and cheap routing of wavelengths in a passive distribution network.

The passivity of the distribution network also presents challenges for providing failure recovery capabilities on this portion of the access network. In one aspect, the present invention describes a novel protection architecture for a passive network.

Passive Architecture For Routing Wavelengths In A WDM Access Network

It is often desirable to route a particular wavelength to a customer without the wavelength being received by any other customer. This is a relatively simple process in a network where active components (for example, high quality multiplexers) are used. However, it is much more difficult in a passive network. One of the most important components for routing wavelengths is an optical multiplexer. A multiplexer picks off (that is, blocks) a particular wavelength, or a group of wavelengths, and lets the other wavelengths pass through. Passive optical multiplexers suffer from sensitivity. For example, their properties change with temperature. For example, a multiplexer may be designed to pick off the wavelength at 190 THz. Due to temperature fluctuations it may instead pick off the wavelength at 190.1 THz. This is a major challenge to overcome in a passive network. The present invention incorporates several architectural principles that allow effective, robust, and cost-effective wavelength routing in a passive network.

One such principle is to use more coarsely packed wavelengths in the passive parts of the network. In the active part of the network, wavelengths can be very densely packed because active filtering technology can be made very precise. In the passive part of the network, the wavelengths should be more coarsely packed. This allows low-cost, passive multiplexers to be used. For example, if the wavelength spacing is 200 GHz, then the multiplexers can have a width of close to 100 GHz without interfering with other wavelengths. If the wavelength spacing were only 50 GHz (as might be used in a feeder network), then the multiplexers can only have a width of close to 25 GHz. Wider multiplexers are less precise, and thus cheaper, and can more easily be realized by completely passive means (for example, without a heater to maintain a certain temperature)

If different wavelength granularities are used in the active and passive portions of the network, then a means of mapping one set of wavelengths to the other is required. This can be accomplished through the use of optical translators (that is, wavelength changers) at the intersection of the passive and active portions of the network. Optical translators are optical devices that take in one wavelength and output a different wavelength, as is well known in the relevant arts.

For example, assume that two distribution networks are attached to an Access Node. One possible wavelength allocation scheme is shown in Table 1. We assume that optical translators are deployed in the Access Node. Note that the wavelengths in the distribution networks are spaced at 200 GHz, while the wavelengths in the feeder network are spaced at 50 GHz.

TABLE 1

| Wavelength in Distribution Network 1 | Maps to This Wavelength in Feeder Network |
|---|---|
| 190.0 THz | 190.100 THz |
| 190.2 THz | 190.150 THz |
| 190.4 THz | 190.200 THz |
| 190.6 THz | 190.250 THz |
| Wavelength in Distribution Network 2 | |
| 190.0 THz | 190.300 THz |
| 190.2 THz | 190.350 THz |
| 190.4 THz | 190.400 THz |
| 190.6 THz | 190.450 THz |

Figure 4:
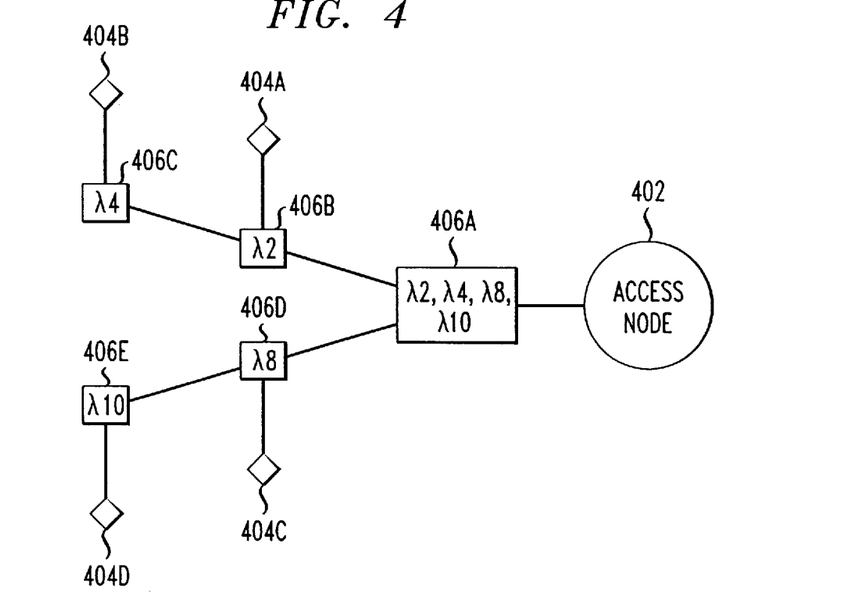
FIG. 4 depicts a passive network having a tree structure.

A second principle is to avoid the use of architectures that require having wavelength multiplexers that precisely match in alignment in the passive portion of the network. As discussed above, passive multiplexer properties can drift. Thus architectures that rely on deploying matching multiplexers in series are not acceptable. For example, assume the passive network has a tree structure as shown in FIG. 4. Referring to FIG. 4, a plurality of filters (also referred to generically as wavelength add/drop (WAD) units) 406A, B, C, D, E is arranged in a tree topology to route traffic to customers 404A, B, C, D. Assume that customer 404A wants $\lambda 2$ routed to it and does not want this wavelength routed to any other customer premises (for example, for security reasons). One strategy would be to deploy a multiplexer 406A that picks off $\lambda 2$ at the first branch point and sends it on the upper branch of the tree, and deploy another filter 406B near the customer premises to send the wavelength to the customer. However, this architecture relies on these two $\lambda 2$ filters having matching passbands; otherwise the wavelength $\lambda 2$ would not make it through both filters. This may not be achievable since both filters will drift somewhat randomly.

Figure 5:
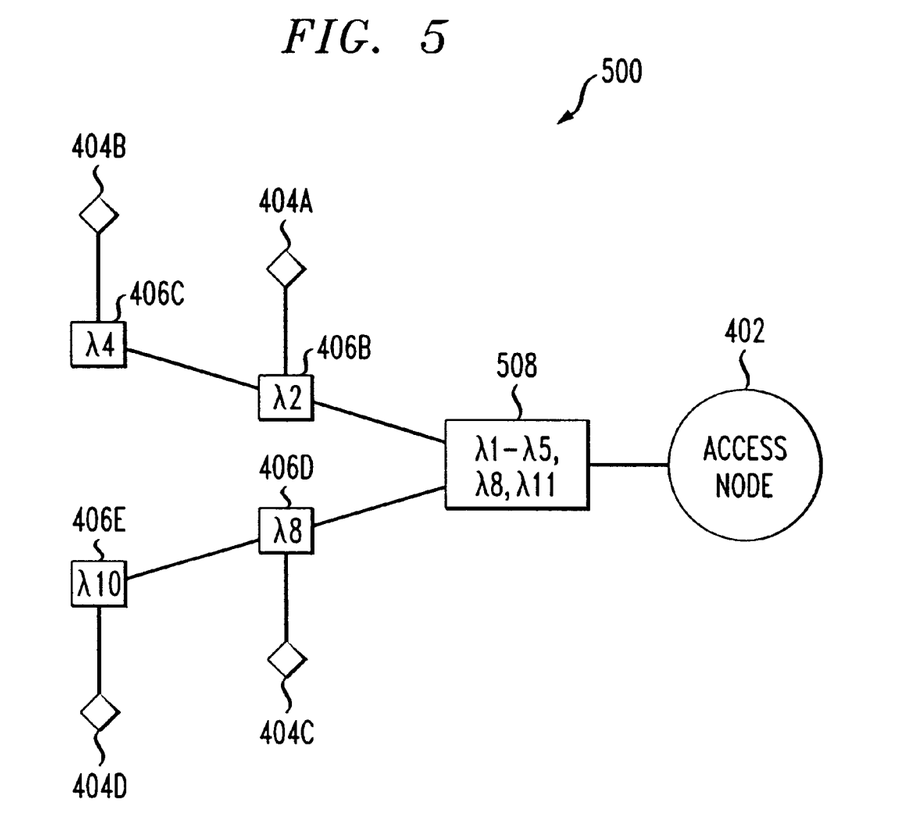
FIGS. 5, 6 and 7 present network architectures according to preferred embodiments of the present invention.

The present invention employs wavelength-specific multiplexers in combination with coarse wavelength band splitters in order to route wavelengths. FIG. 5 presents a network architecture 500 according to a preferred embodiment of the present invention. Referring to FIG. 5, the present invention employs a coarse band splitter so that the architecture does not rely on having multiplexers that precisely match. At the first branch point, a band splitter 508 is used that sends a whole band of wavelengths, that is, $\lambda 1$ through $\lambda 5$, to the top branch of the tree (that is, to customers 404A,B) and a second band of wavelengths, $\lambda 8$ through $\lambda 11$, to the lower branch (that is, to customers 404C,D). A wavelength-specific multiplexer is then deployed near the premises of each customer so that it picks off the proper wavelength for the customer. For example, a $\lambda 2$-specific multiplexer 406B is deployed near the premises of customer 404A so that it picks off the proper wavelength for customer 404A. The architecture can tolerate some drift in the $\lambda 2$ filter because it only needs to align with the band splitter, which has a wide passband. Of course, other architectures can be employed in accordance with this technique.

Figure 6:
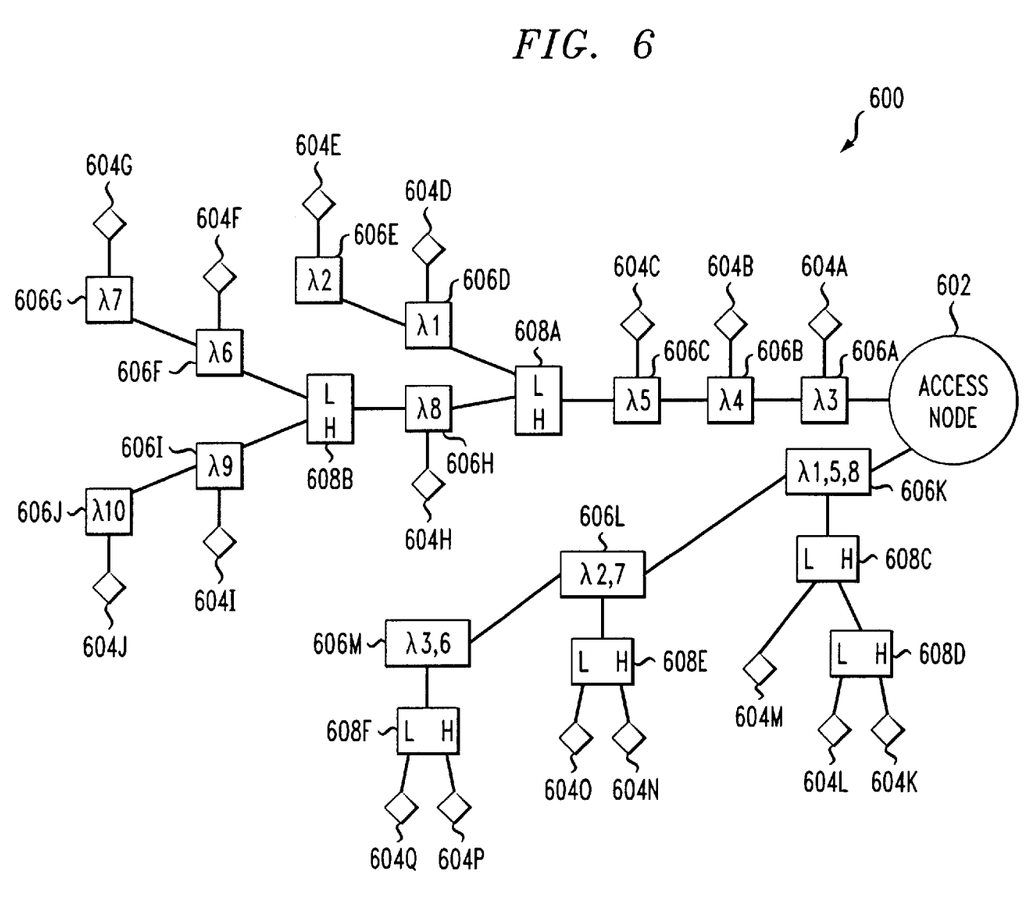

A third principle is to architect the network such that wavelengths that would otherwise be lost due to a wavelength band splitter can be used. Thus, the wavelengths are used efficiently. FIG. 6 presents a network architecture 600 according to a preferred embodiment of the present invention. Architecture 500 made use of coarse band splitters. Such devices split W incoming wavelengths into two bands: $\lambda 1$ through $\lambda A$, and $\lambda A+G$ through $\lambda W$, for some A and G. Note that the G-1 wavelengths that fall between $\lambda A$ and $\lambda A+G$ (referred to as the guardband wavelengths) do not make it through the band splitter. That is, they are lost. This is an unavoidable property of currently known optical band splitters. (More generally, a splitter can partition the wavelengths into multiple bands with a guardband region between each one.)

The architecture of the present invention makes efficient use of the lost wavelengths. The general idea is to peel the guardband wavelengths off before they reach the band splitter. This is illustrated in architecture 600, where there are two distribution fiber pairs connected to access node 602. The upper one (serving customers 604A through 604J) is deployed in a tree topology and the lower one (serving customers 604K through 604Q) is deployed in a bus of trees topology. In FIG. 6, each fiber pair is represented by a single line.

The upper branch includes a plurality of multiplexers 606A,B,C,D,E,F,G,H,I,J and a pair of band splitters 608A,B serving customers 604A,B,C,D,E,F,G,H,I,J. Consider the first band splitter encountered on the top fiber pair, band-splitter 608A. It sends $\lambda 1$ and $\lambda 2$ in one direction, and $\lambda 6$ through $\lambda 10$ in the other direction. $\lambda 3$ through $\lambda 5$ fall in the guardband of this splitter. However, these three wavelengths have already been dropped off at customers prior to reaching the band splitter. Thus, all wavelengths are used efficiently on this tree as opposed to having some lost. The same is true of bandsplitter 608B. $\lambda 8$ lies in its guardband, and $\lambda 8$ has already been picked off upstream for customer 604H.

The bus of trees represented by the lower fiber pair uses a different technique to make sure wavelengths are not lost due to the guardbands. This lower branch includes a plurality of multiplexers 606K,L,M and splitters 608C,D,E,F serving customers 604K,L,M,N,O,P,Q. Here, the band splitters are not placed on the main fiber pair so that wavelengths downstream are not affected. Rather, the band splitters are placed on the small trees that extend from the main fiber pair. This technique of efficiently using the guardband wavelengths is generalizable to many other architectures.

Protection Architecture for a Passive Network

Normally, restoration is accomplished in a network through the use of powered switches (that is, active components). However, some networks, such as the distribution network described above, may be totally passive (that is, contain no active switches or amplifiers). It is desirable to be able to provide restoration capabilities in case of a failure in the passive network (for example, when a fiber is cut). The present invention provides several architectures for providing restoration in a passive network.

Figure 7:
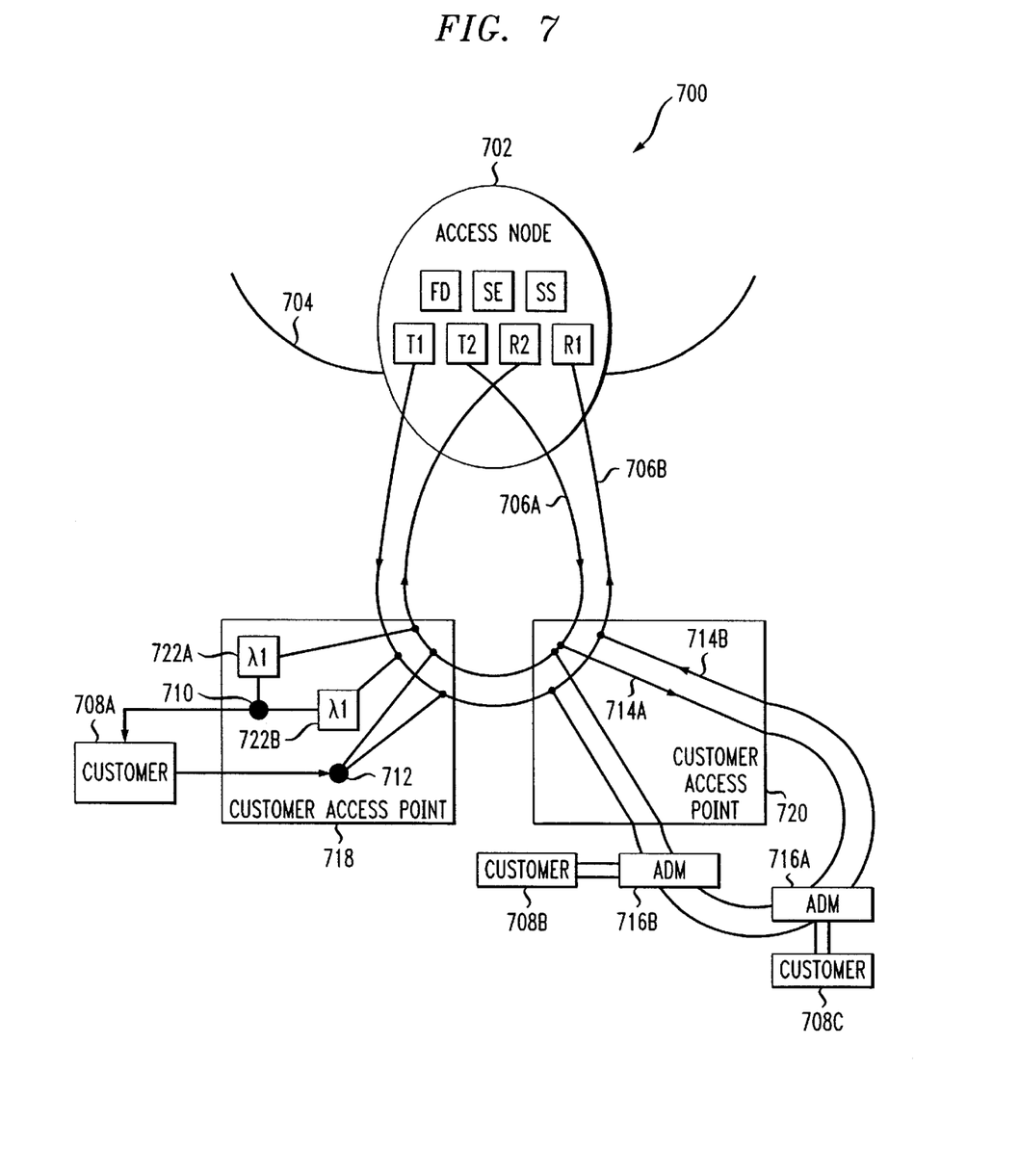

FIG. 7 depicts an access network architecture 700 according to a preferred embodiment. Architecture 700 shows a passive distribution network laid out in a ring topology. The passive distribution ring 706 hangs off an Access Node 702, which is coupled to an feeder network 704. Two fibers 706A and 706B are deployed in passive distribution ring 706. Fiber 706A carries traffic in the clockwise direction, and fiber 706B carries traffic in the counterclockwise direction. Any traffic sent via distribution network 706 is duplicated and sent in both directions. Thus, for example, if a distribution fiber is cut, thereby blocking one direction, communication can still take place in the opposite direction. In conventional implementations, customers are attached to a ring via active switches, facilitating restoration.

In FIG. 7, two types of customers are attached to the passive ring. One is a stand-alone customer 708A that is assigned wavelength λ1. The other type includes two customers, assigned wavelength λ2, attached to an active ring 714. An example of an active ring is a SONET ring; many such rings are already deployed in the field. The present invention provides mechanisms to restore traffic for both types of customers, which are described separately below.

Protection for Stand-Alone Customer

The stand-alone customer makes use of a passive splitter 712 and a passive combiner 710 at customer access point 718 in order to achieve redundancy. A pair of wavelength filters 722A,B couples the passive combiner to fibers 706A, B, respectively. The wavelength filters are tuned to the wavelength λ1 assigned to customer 708A.

First, consider traffic sent from the customer premises 708A to the access node 702. The traffic reaches the point of attachment to the distribution ring and passes through passive 2-way splitter 712. The splitter sends half of the power in the clockwise direction, on fiber 706A, and half in the counterclockwise direction, on fiber 706B. The traffic is identical in the two directions. Access Node 702 has two receivers: receiver R2 to receive traffic from clockwise fiber 706A and receiver R1 to receive traffic from counterclockwise fiber 706B. Receivers R1 and R2 compare the received signals and select the better signal. (Recall that the Access Node can contain active devices, and thus can have signal selectors.) Thus, if there is a fiber cut such that no signal is received on clockwise fiber 706A, traffic is not lost because it is received via counterclockwise fiber 706B.

Next, consider traffic sent from the Access Node to the customer. We cannot simply reverse the above operation. At the point of attachment to the passive distribution ring, a passive combiner 710 is attached to both distribution fibers 706A,B. Passive combiner 710 simply combines traffic arriving on the clockwise and counterclockwise fibers 706, and sends the combination to the customer premises 708A. Thus, if there is traffic on either of the fibers, it is sent to the customer. However, if there is traffic on both fibers at the same time, the two traffic streams interfere with each other. (Since only passive devices are deployed, there is no signal selector at this point.) Thus, Access Node 702 must transmit on only one fiber 706 at a time. For example, under normal operation Access Node 702 may transmit on clockwise fiber 706A using transmitter T2. If there is a failure such that the path to the customer is down, then the Access Node uses the other transmitter T1 and transmits on counterclockwise fiber 706B. Thus, for the stand-alone customer, Access Node 702 detects failures in passive distribution ring 706 and takes appropriate action.

Protection for Active Ring Customers

Restoration is somewhat simpler for the customers 708B,C attached to the active ring, which could be a SONET ring, for example. Active ring 714 is coupled to passive ring 706 at customer access point 720. Customers 708B,C are coupled to active ring 714 by add/drop multiplexers (ADMs) 716A,B, respectively. Note that two fibers are deployed in active ring 714: fiber 714A carries traffic in the clockwise direction and fiber 714B carries traffic in the counterclockwise direction. The two fibers in the passive ring can be considered natural extensions of these fibers, that is, operation can occur as if the Access Node were part of the active ring.

If a customer on active ring 714 wishes to send traffic to Access Node 702, an ADM splits the traffic and transmits it in both directions around the active ring. The traffic continues in two directions around the passive ring, and is received by both receivers in the Access Node. The best signal is selected by the Access Node.

If Access Node 702 is sending traffic to a customer 708 on active ring 714, then the transmitters T1, T2 in the Access Node send the traffic out in both directions around passive ring 706. The two traffic streams continue onto the active ring, and are both received by the customer 708. The customer has a signal selector to select the best signal (this is part of the active ring, so that signal selectors can be deployed).

The protection described above is referred to as "1+1", because there are always two active paths of transmission. It is also possible to employ "1:1" protection. In this scenario, traffic is only sent in one direction around the active ring and the distribution ring. If a failure occurs, in either the active ring or the distribution ring, then traffic is sent in the other direction.

Deploying Switches In A Subset Of The Network Nodes

Figure 8:
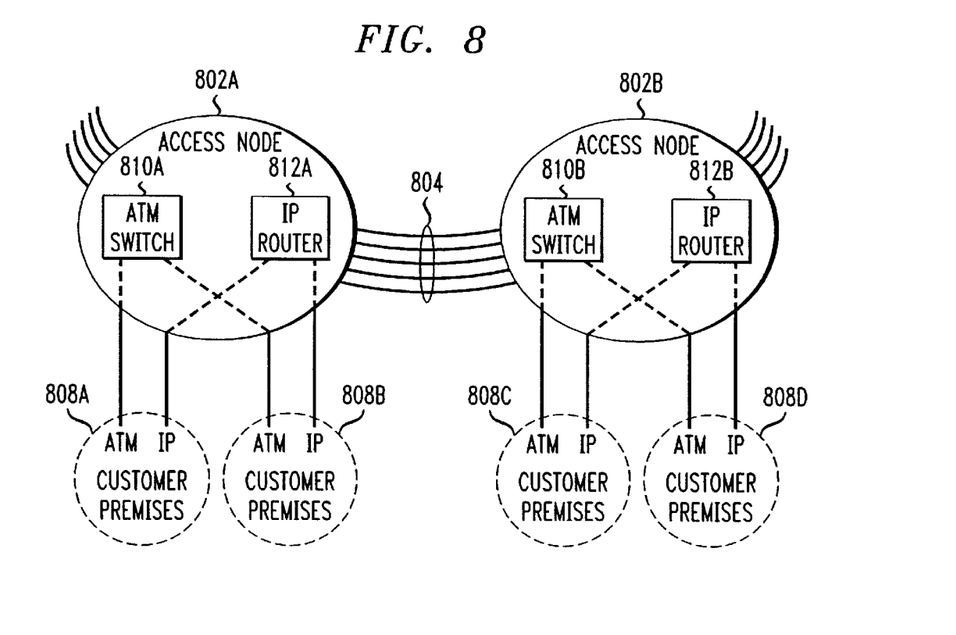
FIG. 8 depicts a conventional network architecture.

In currently known access ring architectures, electronic traffic is aggregated or processed in an appropriate electronic switch or router as soon as the traffic enters an access node. Consider the conventional architecture shown in FIG. 8. FIG. 8 depicts a portion of the network: a portion of the feeder ring 804, two Access Nodes 802A,B on the feeder ring, and customers 808A,B,C,D connected in pairs via distribution fibers to the Access Nodes. Feeder ring 804 comprises a plurality of WDM channels, each transporting a wavelength. Each channel is coupled to an access node 802 by a network port, as is well known in the arts. For illustration purposes, we assume that the customers are sending two types of data traffic to the network: ATM (Asynchronous Transfer Mode) and IP (Internet Protocol).

In FIG. 8, each Access Node is equipped with an ATM switch 810A,B and an IP router 812A,B. (If the customers had additional types of traffic, then additional switches or routers would be deployed in the Access Node accordingly.) As soon as the customer traffic is delivered to the Access Node by the distribution fiber, the traffic is processed by an appropriate switch.

Thus, we see that this conventional architecture requires appropriate switches and routers in each Access Node. There are several problems with such an architecture. First, it can be very costly to deploy the necessary switches in each Access Node. Second, it is very difficult to maintain so many switches; also, a lot of work is required if the equipment needs to be upgraded. Additionally, there may be physical space and power limitations in the Access Node, so that all required switches cannot be accommodated.

Figure 9:
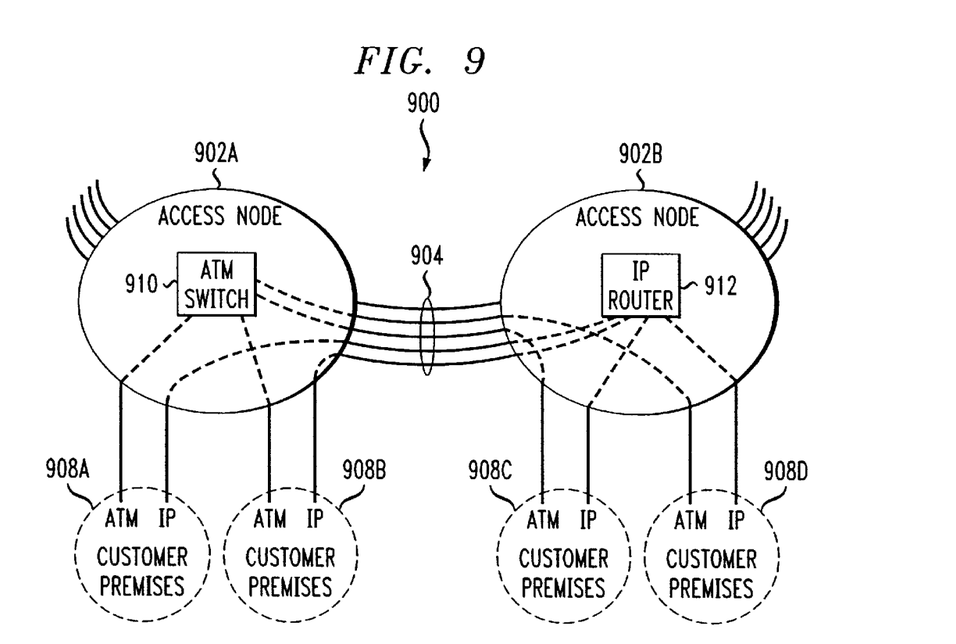
FIG. 9 illustrates a network architecture according to a preferred embodiment of the present invention.

The present invention provides an architecture where switches and routers are not required in every Access Node. FIG. 9 illustrates an architecture 900 according to a preferred embodiment. Feeder ring 904 comprises a plurality of WDM channels. FIG. 9 depicts a portion of the network: a portion of the feeder ring 904, two Access Nodes 902A,B on the feeder ring, and customers 908A,B,C,D connected in pairs via distribution fibers to the Access Nodes. Feeder ring 904 comprises a plurality of WDM channels, each transporting a wavelength. Each channel is coupled to an access node 902 by a network port, as is well known in the arts.

In architecture 900, there is only one ATM switch 910, deployed in Access Node 902A, and only one IP router 912, deployed in Access Node 902B. More generally, there can be any number of switches and routers in each Access Node, as long as there is at least one appropriate switch or router somewhere in the feeder ring 904. Architecture 900 relies on the ability to route wavelengths directly from the distribution network onto the feeder ring without any intervening electronic switches.

Figure 10:
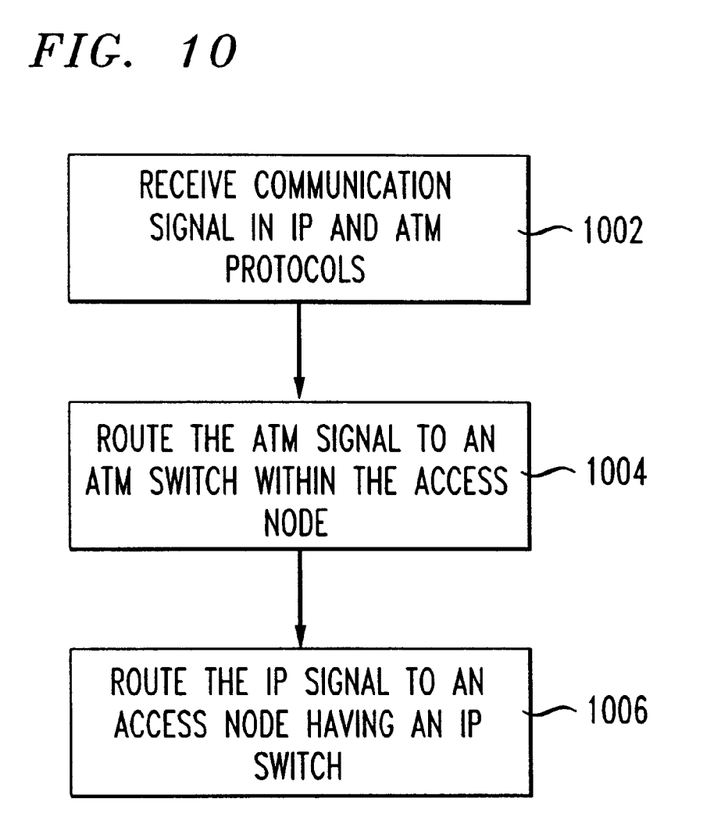
FIG. 10 is a flowchart depicting the operation of an access node according to a preferred embodiment of the present invention.

FIG. 10 is a flowchart depicting the operation of an access node according to a preferred embodiment of the present invention. Access node 902A receives communication signals in both the IP and ATM protocols at 1002. Access node 902A contains an ATM switch 910, and so routes the ATM signals to ATM switch 910 at 1004. However, access node 902A does not contain an IP router. Therefore, access node 902A routes the IP signals to an access node having an IP switch (access node 902B) at 1006.

While various embodiments of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example embodiments, but should be defined only in accordance with the following claims and their equivalents.

What is claimed is:

1. An access node, comprising:
   a switch operating according to a first communication protocol, the access node coupled by a plurality of feeder network channels to a second access node having a second switch operating according to a second communication protocol;
   a first distribution network port coupled to the first switch and coupled to a first distribution network channel bearing signals according to the first communication protocol; and
   a second distribution network port coupled to a second distribution network channel bearing signals according to the second communication protocol and coupled to the second switch by one of the feeder network channels.

2. The access node of claim 1, further comprising:
   a feeder network port coupled to the first switch and coupled to the second access node by a feeder network channels bearing signals according to the first communication protocol.

3. The access node of claim 2, wherein:
   the feeder network channels bearing signals according to the first communication protocol is coupled within the second access node to a third distribution network channel.

4. The access node of claim 3, wherein:
   the channels are wavelength division multiplexed channels.

5. The access node of claim 1, wherein the first switch that corresponds to the first communications protocol is unique to the access node.

6. The access node of claim 1, wherein the second switch that corresponds to the second communications protocol is unique to the second access node.

7. A method for use within an access node, the method comprising:
   receiving communication signals including signals according to a first communications protocol and communication signals according to a second communications protocol;
   selectively routing the communications signals according to the first protocol to a switch within the access node, the switch operating according to the first communications protocol; and
   selectively routing the communications signals according to the second protocol to a second access node.

8. The method of claim 7, wherein the step of selectively routing the communications signals according to a second protocol to a second access node comprises:
   routing the communications signals according to the second protocol to a second switch within the second access node, the second switch operating according to the second communications protocol.

9. The method of claim 6, wherein:
   the signals are wavelength division multiplexed channels.

10. The method of claim 7, wherein the switch that corresponds to the first communications protocol is unique to the access node.

11. The method of claim 8, wherein the second switch that corresponds to the second protocol is unique to the second access node.

12. A system for transmitting signals between a feeder network and a distribution network, comprising:
   a plurality of feeder network channels
   a first access node having a first switch corresponding to a first communication protocol;
   a second access node having a second switch corresponding to a second communication protocol, the second access node coupled to the first access node by the plurality of feeder network channels;
   a first distribution network port coupled to the first switch and a first distribution network channel; and
   a second distribution network port coupled to a second distribution network channel and coupled to the second switch by one of the feeder network channels, wherein the signals on the first distribution channel correspond to the first communication protocol and the signals on the second distribution channel correspond to the second communication protocol.

* * * * *

UNITED STATES PATENT AND TRADEMARK OFFICE
CERTIFICATE OF CORRECTION

PATENT NO.     : 6,512,614 B1
DATED          : January 28, 2003
INVENTOR(S)    : Adel Abdel Moneim Saleh et al.

It is certified that error appears in the above-identified patent and that said Letters Patent is hereby corrected as shown below:

Column 10,
Line 28, please change "6" to -- 8 --.

Signed and Sealed this

Twentieth Day of May, 2003

JAMES E. ROGAN
*Director of the United States Patent and Trademark Office*